United States Patent
Watanabe et al.

(10) Patent No.: US 11,077,880 B2
(45) Date of Patent: Aug. 3, 2021

(54) FRONT VEHICLE BODY STRUCTURE OF VEHICLE

(71) Applicant: Mazda Motor Corporation, Hiroshima (JP)

(72) Inventors: Shigeaki Watanabe, Hiroshima (JP); Hidenori Matsuoka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 89 days.

(21) Appl. No.: 16/567,462

(22) Filed: Sep. 11, 2019

(65) Prior Publication Data

US 2020/0086921 A1 Mar. 19, 2020

(30) Foreign Application Priority Data

Sep. 19, 2018 (JP) .............................. JP2018-174757

(51) Int. Cl.
*B62D 21/11* (2006.01)
*B62D 21/15* (2006.01)
*B60R 21/34* (2011.01)
*B62D 25/08* (2006.01)
*B62D 27/02* (2006.01)

(52) U.S. Cl.
CPC ............ *B62D 21/11* (2013.01); *B62D 21/152* (2013.01); *B60G 2206/016* (2013.01); *B60R 2021/343* (2013.01); *B62D 25/082* (2013.01); *B62D 25/088* (2013.01); *B62D 27/02* (2013.01)

(58) Field of Classification Search
CPC .... B62D 21/11; B62D 21/152; B62D 25/088; B62D 27/02; B62D 25/082; B62D 21/00; B60G 2206/016; B60R 2021/343
See application file for complete search history.

(56) References Cited

U.S. PATENT DOCUMENTS

| 2007/0215402 A1* | 9/2007 | Sasaki ................. | B62D 25/088 180/232 |
|---|---|---|---|
| 2010/0026047 A1* | 2/2010 | Baccouche .......... | B62D 21/152 296/187.09 |
| 2011/0095568 A1* | 4/2011 | Terada ................. | B62D 21/11 296/187.09 |
| 2012/0205944 A1* | 8/2012 | Kido .................... | B62D 25/088 296/187.09 |
| 2012/0313360 A1* | 12/2012 | Akaki ................... | B62D 21/152 280/784 |
| 2015/0166108 A1* | 6/2015 | Persson ................ | B62D 21/152 296/187.09 |

(Continued)

FOREIGN PATENT DOCUMENTS

JP 2011005882 A 1/2011

*Primary Examiner* — Drew J Brown
(74) *Attorney, Agent, or Firm* — Alleman Hall Creasman & Tuttle LLP

(57) ABSTRACT

A suspension housing which is provided at a front part of a vehicle and to which a suspension is mounted has a first fixed portion and a second fixed portion that are provided at positions separated from each other in a front-rear direction and each fixed to a front frame. The suspension housing further has, at a position between the first fixed portion and the second fixed portion in the front-rear direction, a buckling promoting portion that promotes buckling of the suspension housing when a load is applied from the front frame to the suspension housing in the front-rear direction.

10 Claims, 13 Drawing Sheets

(56) References Cited

U.S. PATENT DOCUMENTS

2016/0244103 A1\* 8/2016 Amemiya .............. B62D 21/00
2019/0031240 A1\* 1/2019 Uehata .................. B62D 21/11
2019/0300067 A1\* 10/2019 Ogawa .................. B62D 25/18

\* cited by examiner

FRONT VEHICLE BODY STRUCTURE OF VEHICLE

BACKGROUND

The present invention relates to a front vehicle body structure of a vehicle having, at a front part thereof, a suspension housing to which components of a suspension are mounted.

DESCRIPTION OF THE RELATED ART

At a front part of a vehicle, such as an automobile, a suspension housing to which components of a suspension including a damper are mounted is provided. The suspension housing is fixed to a front frame extending in a vehicle front-rear direction (e.g., see Japanese Patent Laid-Open No. 2011-005882).

Suspension housings are commonly manufactured by a method of pressing a steel sheet. On the other hand, in view of the relatively low shaping flexibility of the pressing method, and aiming at a further weight reduction of vehicle bodies, some manufacturers are also considering a method of casting a suspension housing with aluminum (aluminum die casting).

It is common for automobiles, etc. to allow the front frame to deform during a collision of the vehicle and thus absorb the impact force by the front frame. This makes it desirable that the suspension housing deform easily as the front frame deforms. On the other hand, it is also desirable to enhance the rigidity of the suspension housing to appropriately support the suspension.

An object of the present invention is to provide a front vehicle body structure of a vehicle that is capable of both appropriately supporting a suspension and allowing a front frame to deform appropriately.

SUMMARY

To achieve the above object, the present invention provides a front vehicle body structure of a vehicle including: a front frame provided at a front part of the vehicle and extending in a vehicle front-rear direction; and a suspension housing which is provided at the front part of the vehicle and to which a suspension is mounted, wherein the suspension housing has a first fixed portion and a second fixed portion that are provided at positions separated from each other in the front-rear direction and each fixed to the front frame, and a buckling promoting portion that is provided at a position between the first fixed portion and the second fixed portion in the front-rear direction and promotes buckling of the suspension housing when a load is applied from the front frame to the suspension housing in the front-rear direction.

In this configuration, the first fixed portion and the second fixed portion of the suspension housing are fixed to the front frame, and the suspension housing and the front frame are firmly fixed to each other. The buckling promoting portion that promotes buckling of the suspension housing is provided at a portion between the first fixed portion and the second fixed portion. When a portion of the front frame at which the first fixed portion is fixed begins to shift or deform relative to a portion thereof at which the second fixed portion is fixed, this buckling promoting portion allows the suspension housing to buckle easily at the portion between the first fixed portion and the second fixed portion, thereby preventing the suspension housing from hindering shift and deformation of the front frame. Thus, this configuration makes it possible to allow the front frame to deform appropriately while enhancing the rigidity of the suspension housing so that the suspension housing can appropriately support the suspension.

In the above configuration, the buckling promoting portion may be formed in an inner side surface in a vehicle width direction of the suspension housing and may have a shape extending in an up-down direction with a bend protruding inward in the vehicle width direction.

In this configuration, the buckling promoting portion is formed in the inner side surface in the vehicle width direction of the suspension housing and has a shape extending in the up-down direction with a bend protruding inward in the vehicle width direction. This buckling promoting portion allows the inner side surface in the vehicle width direction of the suspension housing and, as a consequence, the suspension housing as a whole to buckle more easily in the front-rear direction, and moreover allows this inner side surface in the vehicle width direction and, as a consequence, the suspension housing as a whole to deform inward in the vehicle width direction, thereby preventing the suspension housing from popping out toward a vehicle outer side.

In the above configuration, the suspension housing may include a plurality of arm supporting parts that are provided at positions separated from one another in the front-rear direction and support a suspension arm of the suspension, and a bulge that is formed in a region of the inner side surface in the vehicle width direction of the suspension housing, located between the arm supporting parts in the front-rear direction, so as to bulge inward in the vehicle width direction.

In this configuration, deformation and buckling of the suspension housing in the front-rear direction can be promoted by the bulge and the buckling promoting portion. Moreover, when mounting the suspension arm to the arm supporting part from the vehicle outer side, this bulge can be used to secure a large mounting space, which can enhance work efficiency.

In the above configuration, the bulge may be one of a plurality of bulges separated from one another in the vehicle front-rear direction, and the buckling promoting portion may be provided between the bulges in the front-rear direction.

In this configuration, deformation and buckling of the suspension housing in the front-rear direction can be further promoted by the bulges and the buckling promoting portion.

The present invention can provide a front vehicle body structure of a vehicle that is capable of both appropriately supporting a suspension and allowing a front frame to deform appropriately.

DETAILED DESCRIPTION

Figure 1:
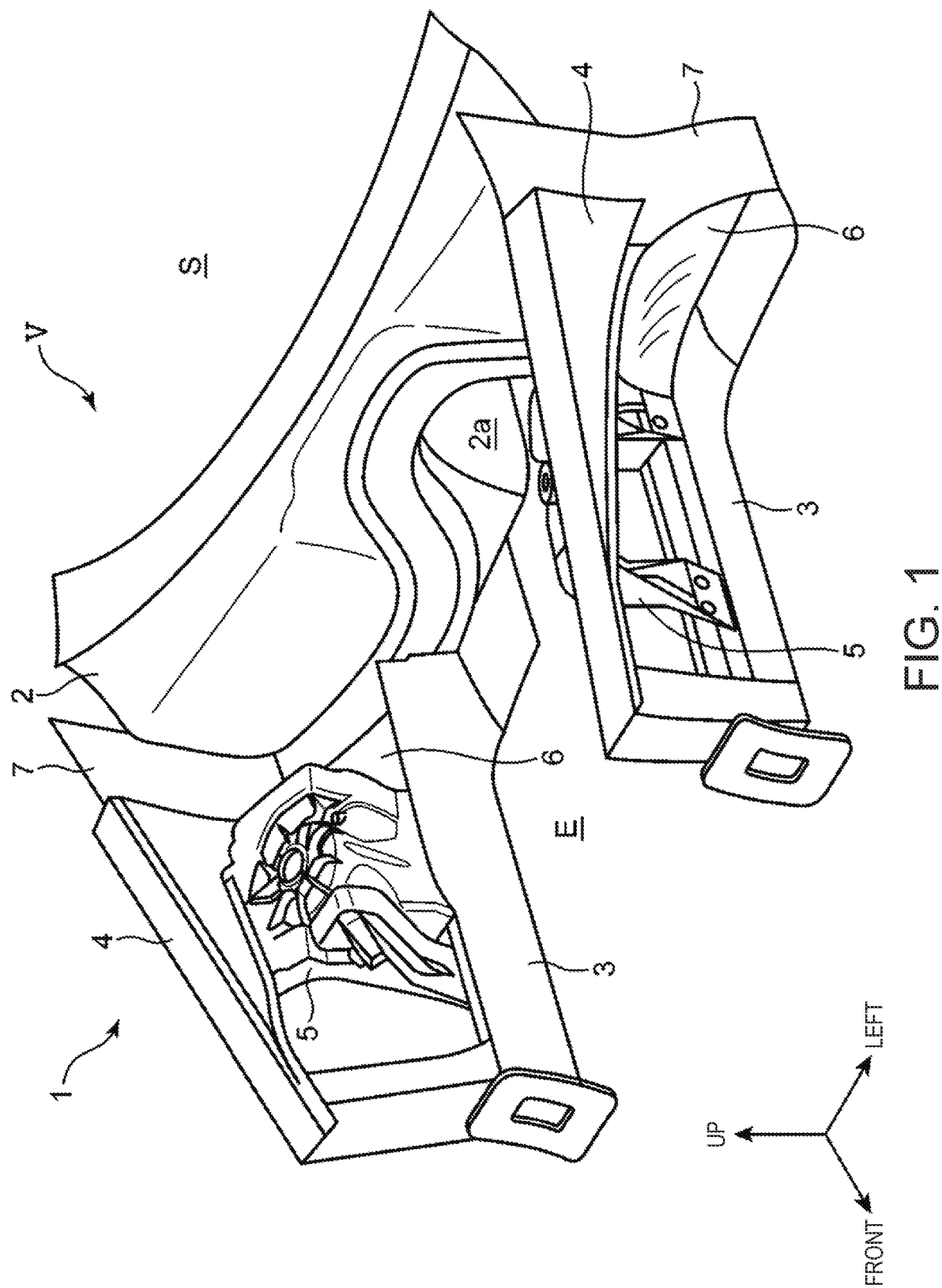
FIG. 1 is a perspective view schematically showing a front vehicle body structure of a vehicle according to the present invention.
Figure 2:
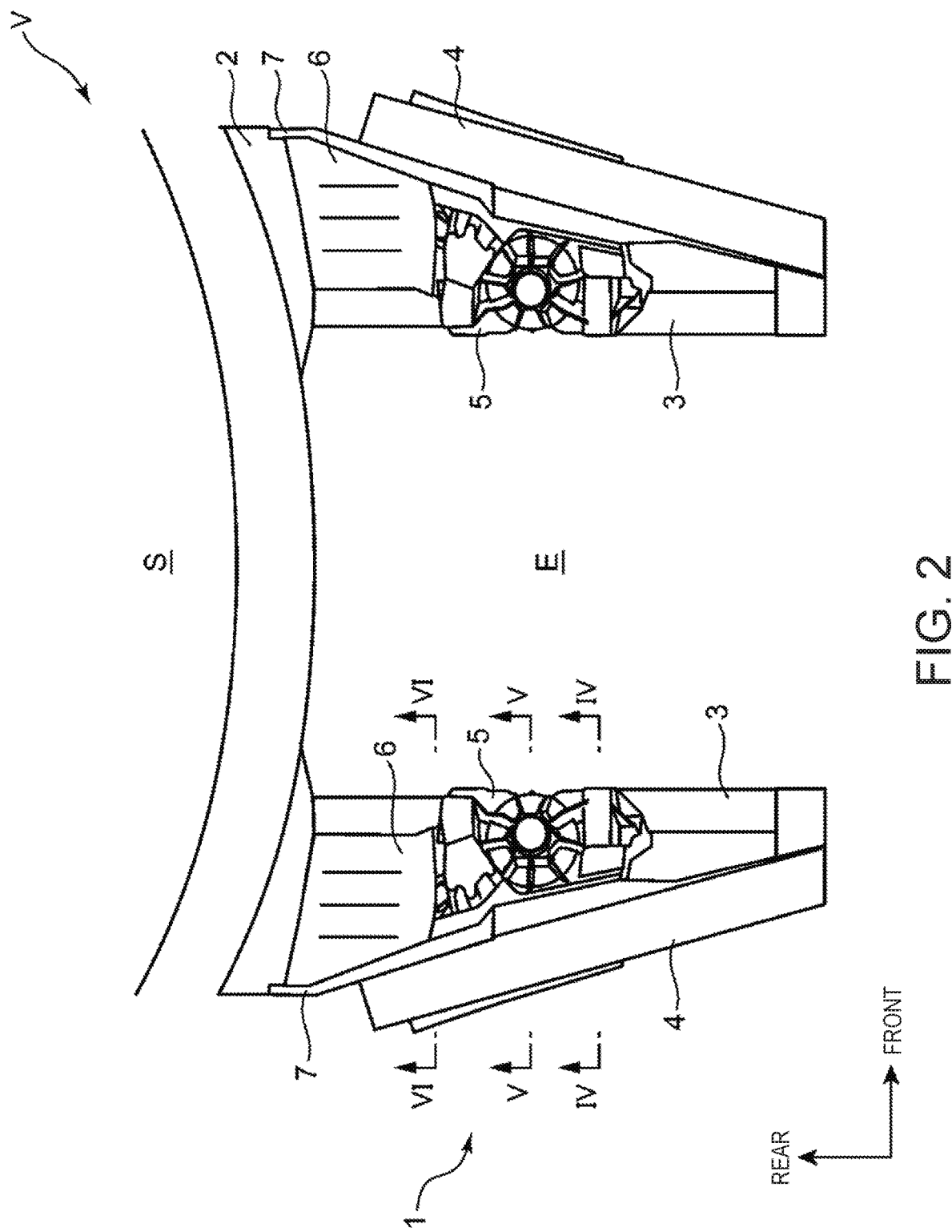
FIG. 2 is a top view schematically showing the front vehicle body structure of the vehicle.
Figure 3:
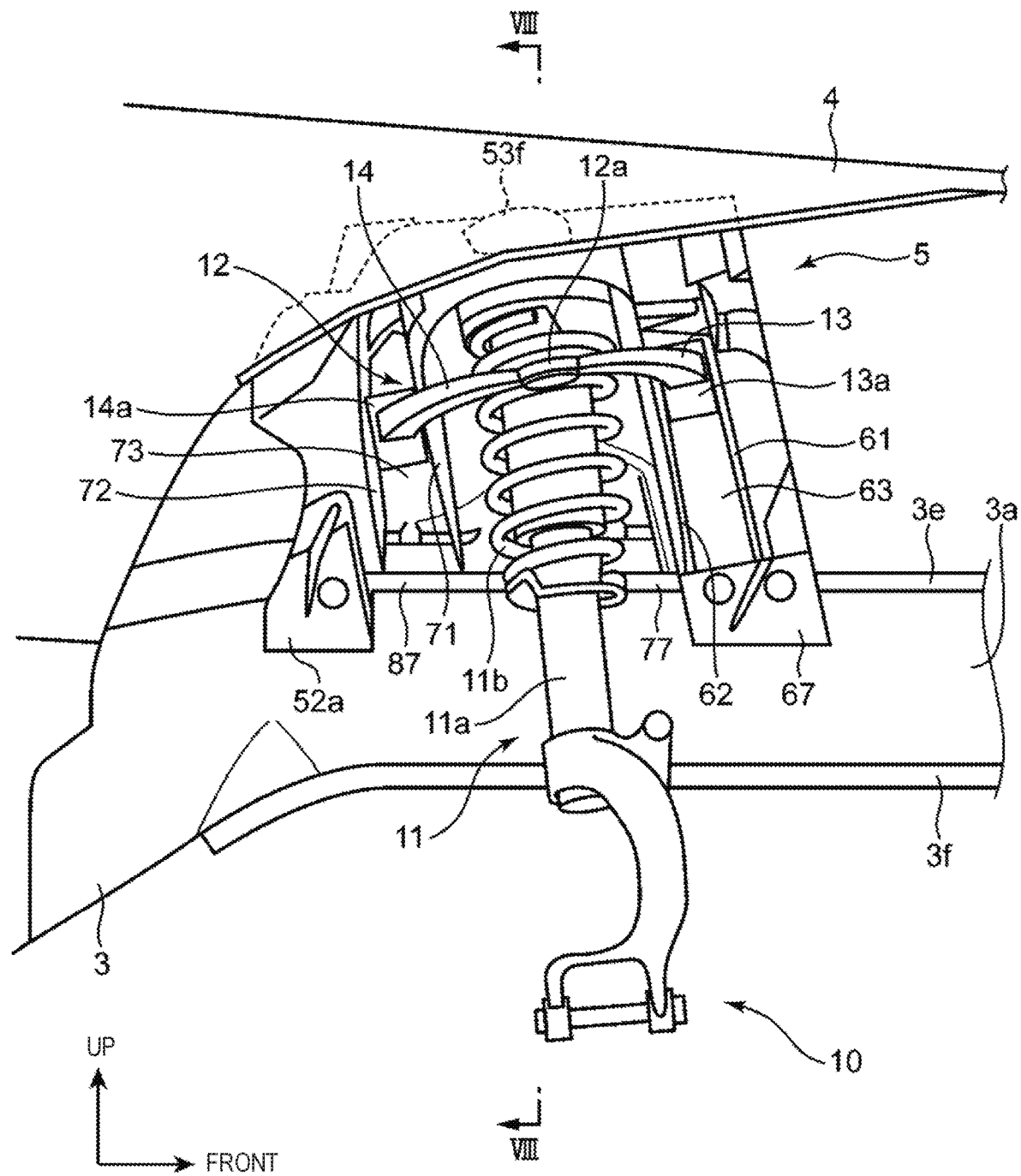
FIG. 3 is a schematic side view showing part of the front vehicle body structure of the vehicle as seen from an outer side in a vehicle width direction.

An embodiment of the present invention will be described below in detail based on the drawings. FIG. 1 is a perspective view schematically showing the structure of a front vehicle body 1 of a vehicle V according to the present invention. FIG. 2 is a top view schematically showing the structure of the front vehicle body 1 of the vehicle V. FIG. 3 is a side view schematically showing part of the front vehicle body 1 of the vehicle V. FIG. 3 is a view of part of a right-side part, with the viewing direction oriented frontward, of the front vehicle body 1 of the vehicle V as seen from an outer side in a vehicle width direction. Hereinafter, a front-rear direction of the vehicle will be referred to simply as a front-rear direction, and where appropriate, the vehicle width direction will be referred to as a right-left direction. Right and left with the viewing direction oriented frontward will be referred to simply as right and left. In the drawings, "in" means an inner side in the vehicle width direction and "out" means an outer side in the vehicle width direction.

At a front part of the vehicle V, a dashboard panel 2 is provided that forms a front end portion of a vehicle cabin S and defines an engine compartment E (a part where an engine unit (not shown) composed of an engine, a transmission, etc. is installed) and the vehicle cabin S. The dashboard panel 2 is a panel extending in an up-down direction and the vehicle width direction. In this embodiment, the vehicle V is a front-engine, rear-wheel-drive vehicle (a so-called FR vehicle) configured such that an output of the engine installed at the front part is transmitted to the rear wheels, and a tunnel 2a through which a propeller shaft is passed is formed at a center in the vehicle width direction of the dashboard panel 2.

At the front part of the vehicle V, front frames 3, apron reinforcements 4, and suspension housings 5 are provided. At the front part of the vehicle V, coupling panels 6 each interposed between the suspension housing 5 and the dashboard panel 2 is provided. The front frames 3, the apron reinforcements 4, the suspension housings 5, and the coupling panels 6 are right and left pairs of vehicle body constituent members. At the front part of the vehicle V, suspensions 10 are provided. The suspensions 10 are respectively provided on the right and left sides so as to correspond to a right and left pair of front wheels. The suspensions 10 are not shown in FIG. 1 and FIG. 2.

The front structure of the vehicle V is symmetrical in the right-left direction, and therefore the structure on one of the right and left sides will be described below.

<Apron Reinforcement>

The apron reinforcement 4 is a reinforcement member extending in the front-rear direction. The apron reinforcement 4 extends frontward from a hinge pillar 7 to which a hinge of a front door of the vehicle is mounted. A front part of the apron reinforcement 4 independently forms a closed cross-sectional part extending in the front-rear direction, while a rear part of the apron reinforcement 4 forms a closed cross-sectional part extending in the front-rear direction together with the suspension housing 5 as will be described later.

<Front Frame>

Figure 4:
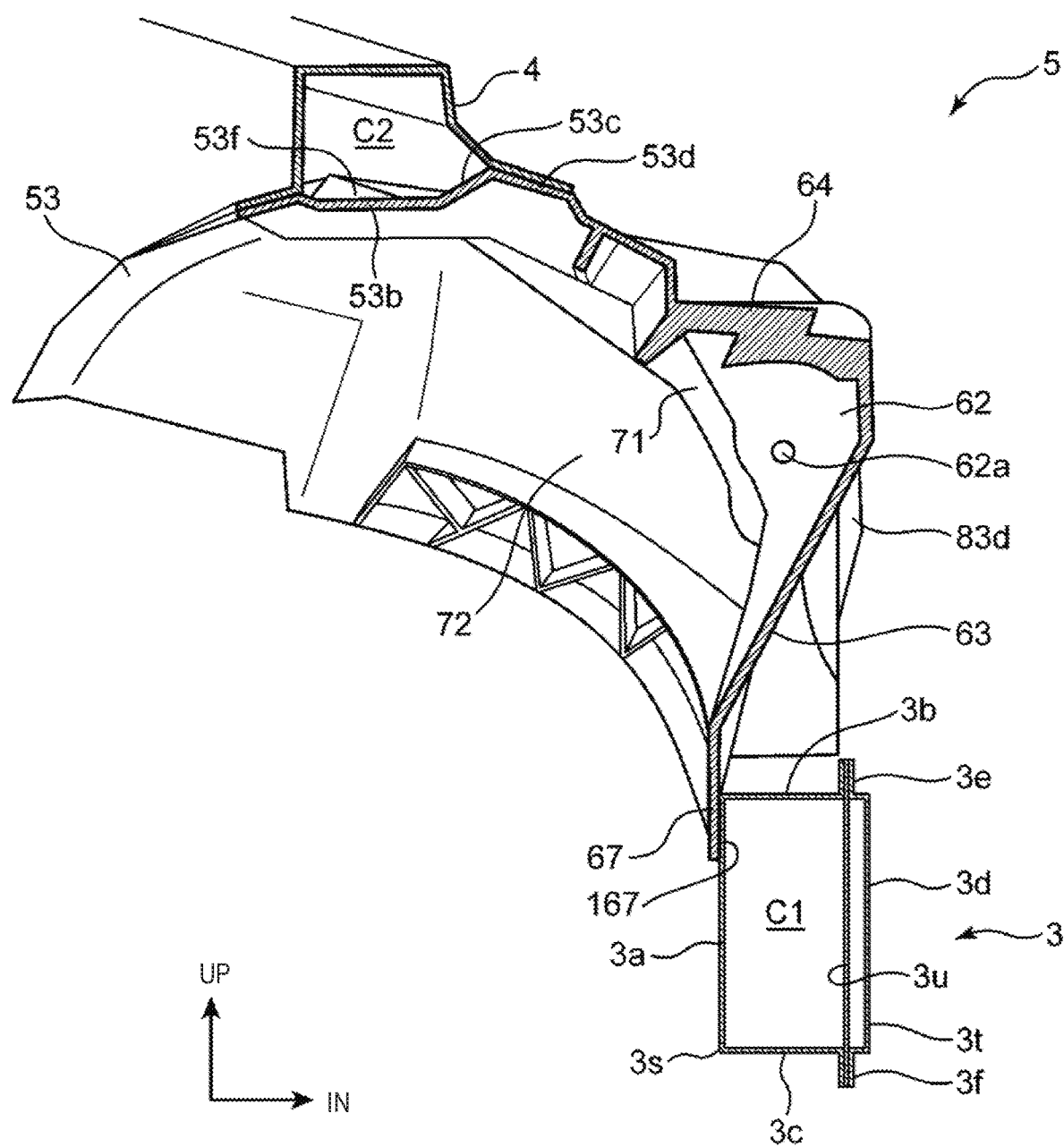
FIG. 4 is a schematic view of section IV-IV of FIG. 2.
Figure 5:
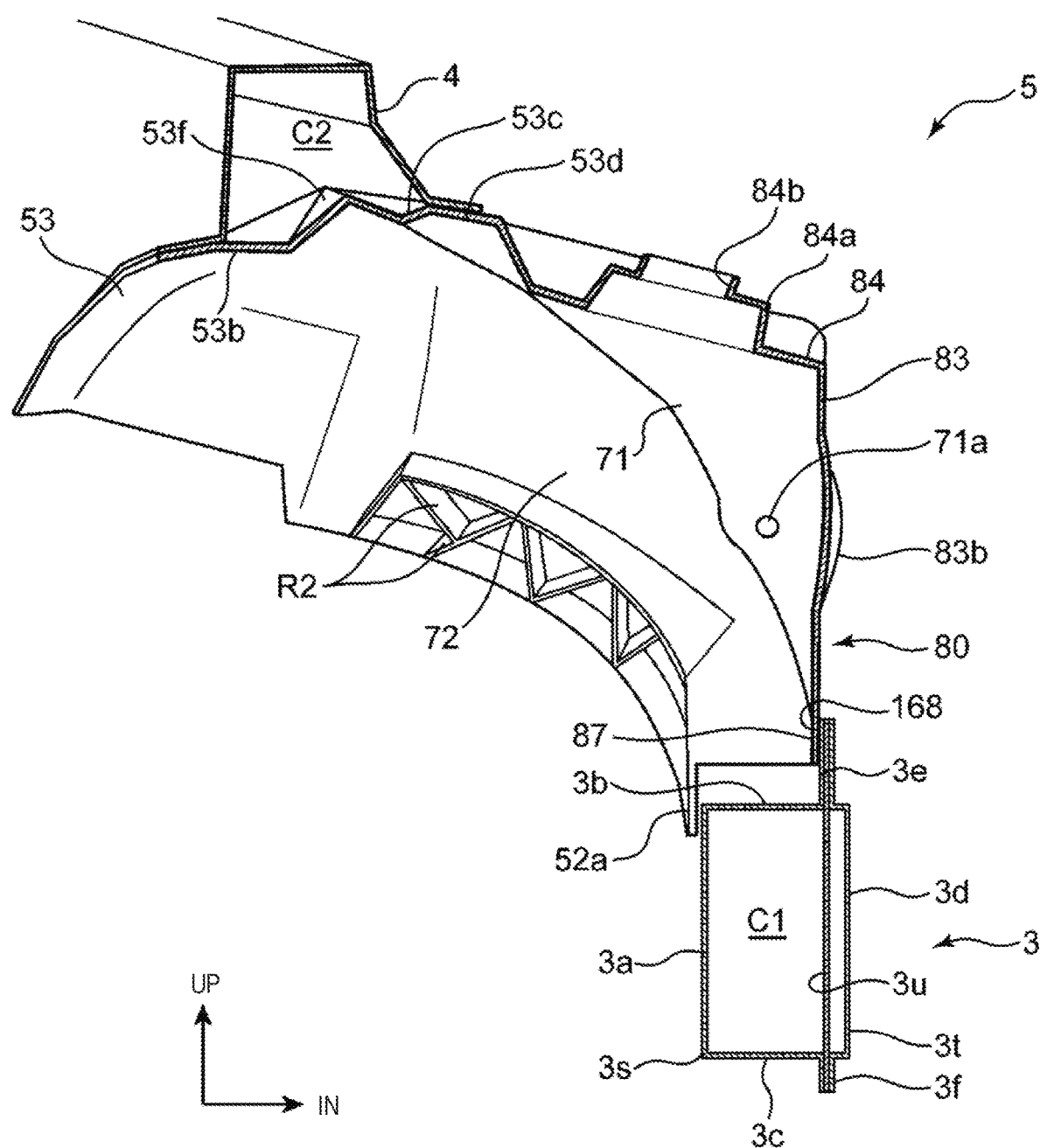
FIG. 5 is a schematic view of section V-V of FIG. 2.
Figure 6:
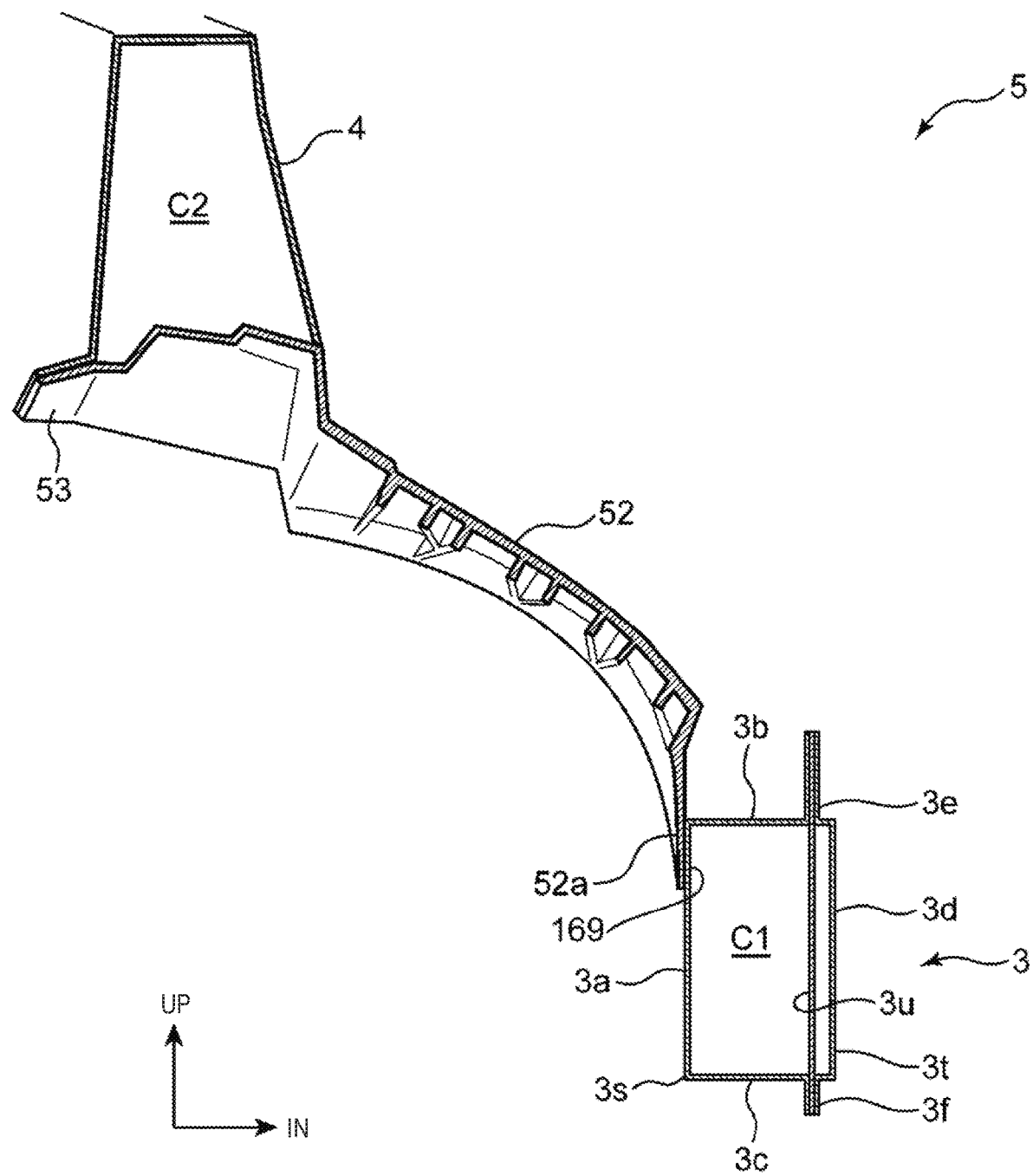
FIG. 6 is a schematic view of section VI-VI of FIG. 2.

FIG. 4 is a schematic view showing a close-up of section IV-IV of FIG. 2. FIG. 5 is a schematic view showing a close-up of section V-V of FIG. 2. FIG. 6 is a schematic view showing a close-up of section VI-VI of FIG. 2.

The front frame 3 is a vehicle body rigid member that forms a closed cross-sectional part C1 extending in the front-rear direction. The front frame 3 is fixed to the dashboard panel 2 and extends frontward from the dashboard panel 2. The front frame 3 is disposed at a position below the apron reinforcement 4 and on the inner side in the vehicle width direction of the apron reinforcement 4. For example, the right front frame 3 is disposed at a position in a direction of about 45 degrees toward an obliquely lower left side relative to the right apron reinforcement 4. Between the apron reinforcement 4 and the front frame 3 is provided a space in which a wheel well WH to cover a front wheel (not shown) can be formed.

As shown in FIG. 4, the closed cross-sectional part C1 has a substantially rectangular parallelepiped shape elongated in the up-down direction, and the front frame 3 has: a first side surface part 3a extending in the up-down direction and the front-rear direction and forming an outer side surface in the vehicle width direction of the front frame 3; an upper surface part 3b extending inward in the vehicle width direction from an upper edge of the first side surface part 3a and forming an upper surface of the front frame 3; a lower surface part 3c extending inward in the vehicle width direction from a lower edge of the first side surface part 3a and forming a lower surface of the front frame 3; and a second side surface part 3d extending in the up-down direction between an inner edge in the vehicle width direction of the upper surface part 3b and an inner edge in the vehicle width direction of the lower surface part 3c and forming an inner side surface in the vehicle width direction of the front frame 3. The front frame 3 further includes an upper flange 3e extending upward from near the inner edge in the vehicle width direction of the upper surface part 3b, i.e., the upper surface of the front frame 3, and a lower flange 3f extending downward from near the inner edge in the vehicle width direction of the lower surface part 3c, i.e., the lower surface of the front frame 3. The upper flange 3e and the lower flange 3f extend in the front-rear direction along the entire length of the front frame 3.

Each front frame 3 is made of a sheet-shaped steel material, for example, and is formed by joining together three members: a front frame outer part 3s with a substantially top-hat-shaped cross-section that is provided on the outer side in the vehicle width direction and protrudes outward in the vehicle width direction; a front frame inner part 3t with a substantially hat-shaped cross-section that is provided on the inner side in the vehicle width direction and protrudes slightly inward in the vehicle width direction; and a plate-shaped flange forming panel 3u that is interposed between the front frame outer part 3s and the front frame inner part 3t and extends in the up-down direction. For example, the upper flange 3e is formed as a flange portion formed in the front frame outer part 3s, an upper end portion of the flange forming panel 3u, and a flange portion formed in the front frame inner part 3t are joined together.

The front frame 3 is configured to deform when the vehicle collides and an impact is exerted on the front frame 3 in the vehicle front-rear direction and thereby restrain this impact from being transmitted to the vehicle cabin S. For example, when the vehicle undergoes a frontal collision and an impact force is exerted on the front frame 3 from the front side, the front frame 3 buckles at a plurality of points, so that the impact force is restrained from being transmitted through the front frame 3 to the dashboard panel 2 and eventually to the inside of the vehicle cabin S.

<Suspension>

In this embodiment, a double-wishbone suspension is used as the suspension 10. The suspension 10 includes: a knuckle (not shown) fixed to a tire (not shown); a lower arm (not shown) coupled to the knuckle and supporting the tire through the knuckle; an upper arm 12 (a so-called A-arm) disposed above the lower arm and, like the lower arm, coupled to the knuckle and supporting the tire through the knuckle; and a damper 11. The damper 11 includes a shock absorber 11a and a coil spring 11b installed so as to surround an outer periphery of the shock absorber 11a. The upper arm 12 is one example of a "suspension arm."

Figure 7:
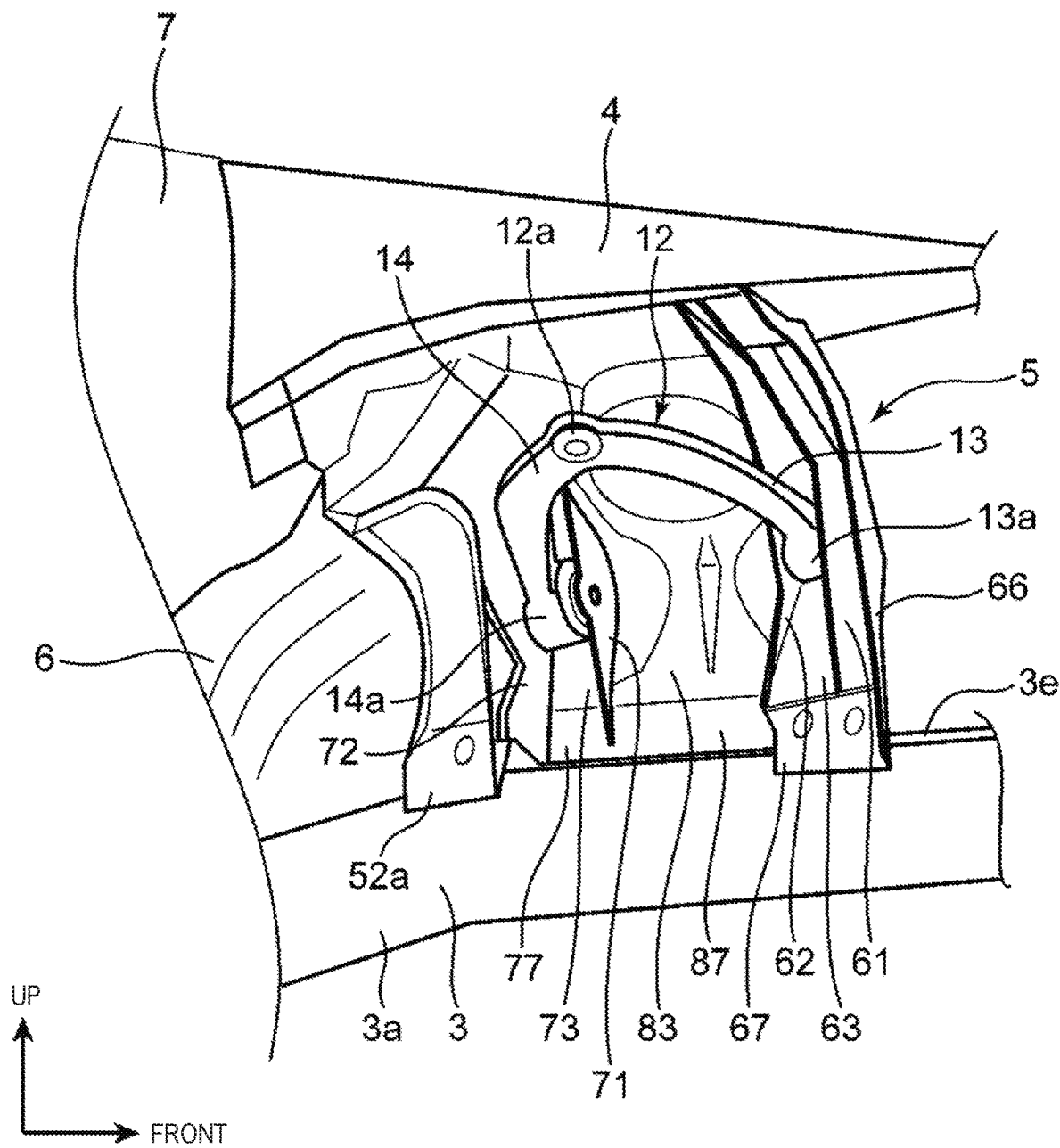
FIG. 7 is a schematic perspective view of part of the front vehicle body structure of the vehicle as seen from the outer side in the vehicle width direction.

FIG. 7 is a schematic perspective view of part of the right-side part of the front vehicle body 1 of the vehicle V as seen from an obliquely lower right side. The damper 11 is omitted from FIG. 7 as compared with FIG. 3.

The upper arm 12 has a knuckle fixing portion 12a to which an upper end of the knuckle is fixed. The knuckle fixing portion 12a is provided at an outermost end in the vehicle width direction of the upper arm 12, and the upper arm 12 includes a first arm 13 extending from the knuckle fixing portion 12a while curving frontward and inward in the vehicle width direction, and a second arm 14 extending from the knuckle fixing portion 12a while curving rearward and inward in the vehicle width direction.

A first pivotally supported portion 13a and a second pivotally supported portion 14a each pivotally supported by the suspension housing 5 are provided at an inner end in the vehicle width direction of the first arm 13 and an inner end in the vehicle width direction of the second arm 14, respectively. The first pivotally supported portion 13a and the second pivotally supported portion 14a are fixed to the suspension housing 5 so as to be able to rotate around an axis extending in the front-rear direction, and the upper arm 12 is supported by the suspension housing 5 so as to be able to turn in the up-down direction around a rotational central axis of these pivotally supported portions 13a, 14a.

Figure 8:
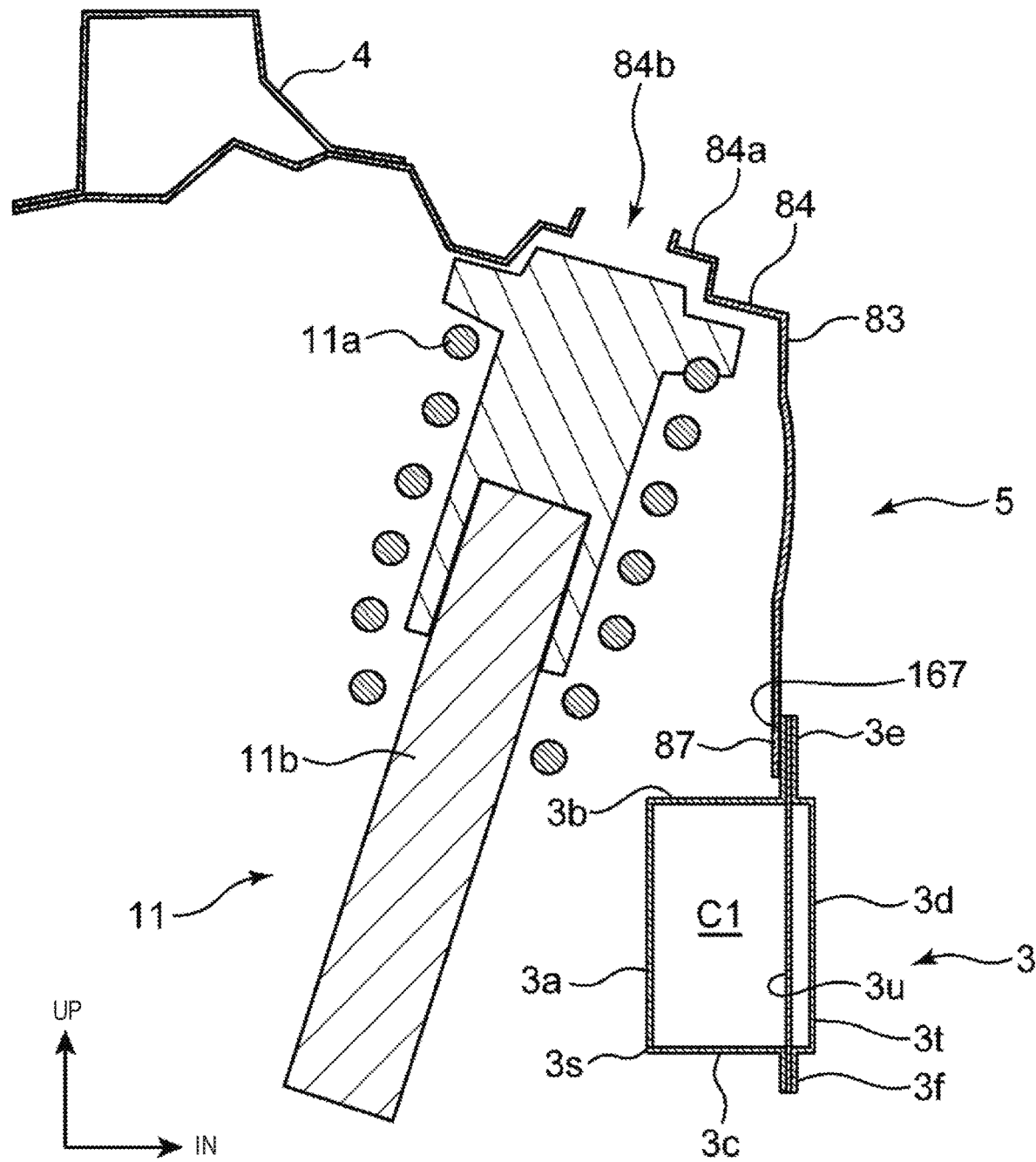
FIG. 8 is a schematic view of section VIII-VIII of FIG. 3.

The damper 11 is supported by the suspension housing 5 and the lower arm in a posture in which the damper 11 extends in the up-down direction. More specifically, a lower end portion of the damper 11 is supported by the lower arm while an upper end portion of the damper 11 is supported by the suspension housing 5. As shown in FIG. 3, the damper 11 is supported in a rearward tilted posture in which the damper 11 is inclined toward an obliquely upper rear side (i.e., a posture in which the upper side of the damper 11 is located farther on the rear side than the lower side). Moreover, as shown in FIG. 8 that is a schematic view of section VIII-VIII of FIG. 3, the damper 11 is supported in an inward tilted posture in which the damper 11 is inclined toward an obliquely upper inner side (i.e., a posture in which the upper side of the damper 11 is located farther on the inner side in the vehicle width direction than the lower side).

<Suspension Housing>

The suspension housing 5 is a member to which components of the suspension 10 are mounted. As described above, the upper end portion of the damper 11 and the pivotally supported portions 13a, 14a of the upper arm 12 are mounted to the suspension housing 5.

The suspension housing 5 has a shape of a housing that houses the damper 11 and opens at a lower end, and is fixed to the front frame 3 and the apron reinforcement 4 so as to cover the upper side of the wheel well WH. As described above, the front frame 3 is disposed below the apron reinforcement 4 and on the inner side in the vehicle width direction of the apron reinforcement 4. Accordingly, the suspension housing 5 as a whole has a shape extending from the apron reinforcement 4 toward the front frame 3 in a direction downward and inward in the vehicle width direction, and bridges a space between these members.

As shown in FIG. 2, etc., a rear end portion of the suspension housing 5 is further fixed to the coupling panel 6. The coupling panel 6 is a panel member, of which a rear part extends substantially horizontally while a front part is inclined toward an obliquely upper front side such that the front side of the front part is located farther on the upper side than the rear side thereof. The coupling panel 6 is fixed to the dashboard panel 2 so as to extend frontward from the dashboard panel 2. Thus, the suspension housing 5 is coupled to the dashboard panel 2 through the front frame 3 and the coupling panel 6. An outer edge in the vehicle width direction of the coupling panel 6 is further fixed to the hinge pillar 7.

Formed by aluminum die casting, the suspension housing 5 in this embodiment is a lightweight, intricately shaped suspension housing 5. Alternatively, the suspension housing 5 may be formed by performing press-working, etc. on a metal sheet member.

Figure 9:
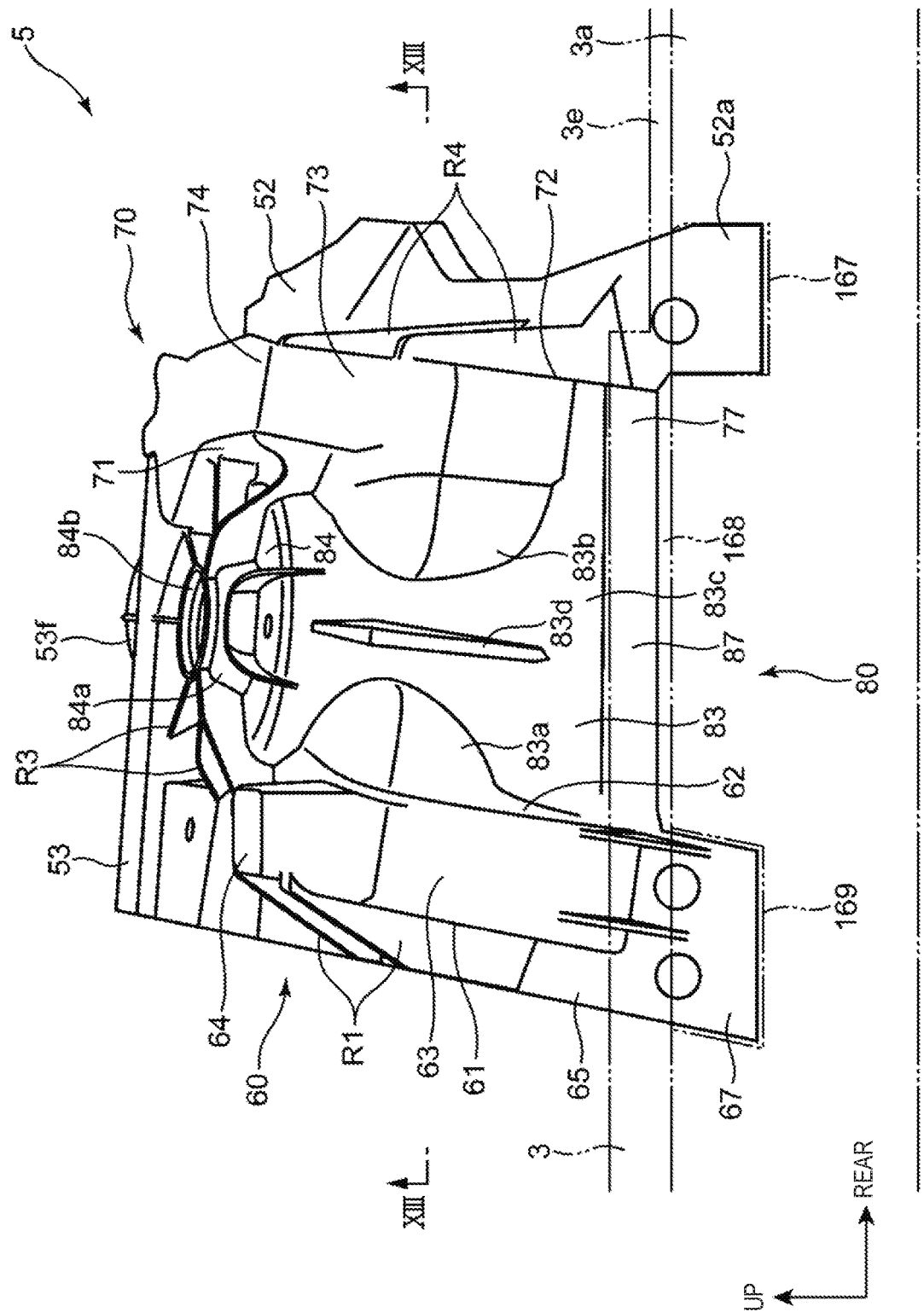
FIG. 9 is a schematic side view of a suspension housing as seen from an inner side in the vehicle width direction.
Figure 10:
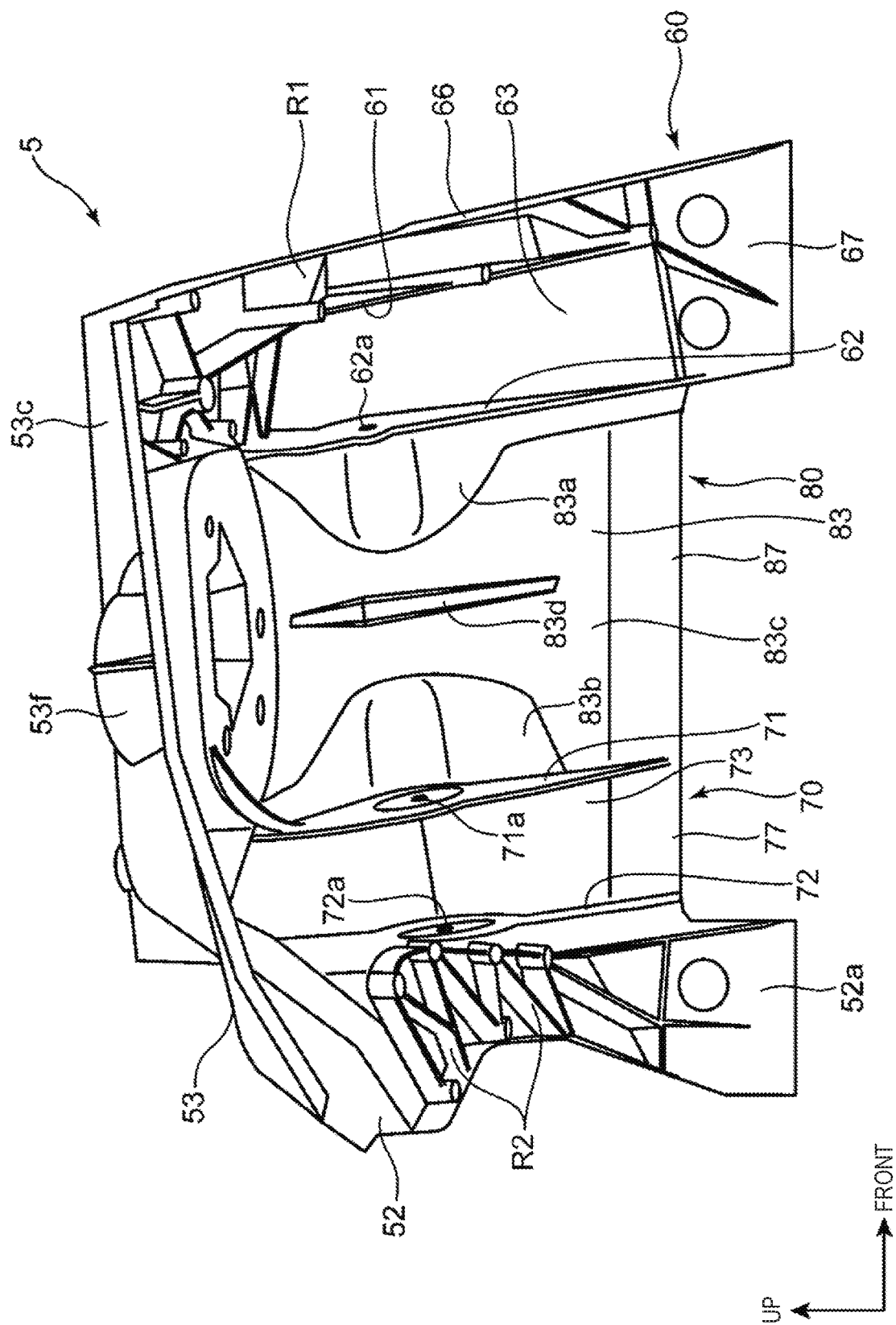
FIG. 10 is a schematic side view of the suspension housing as seen from the outer side in the vehicle width direction.
Figure 11:
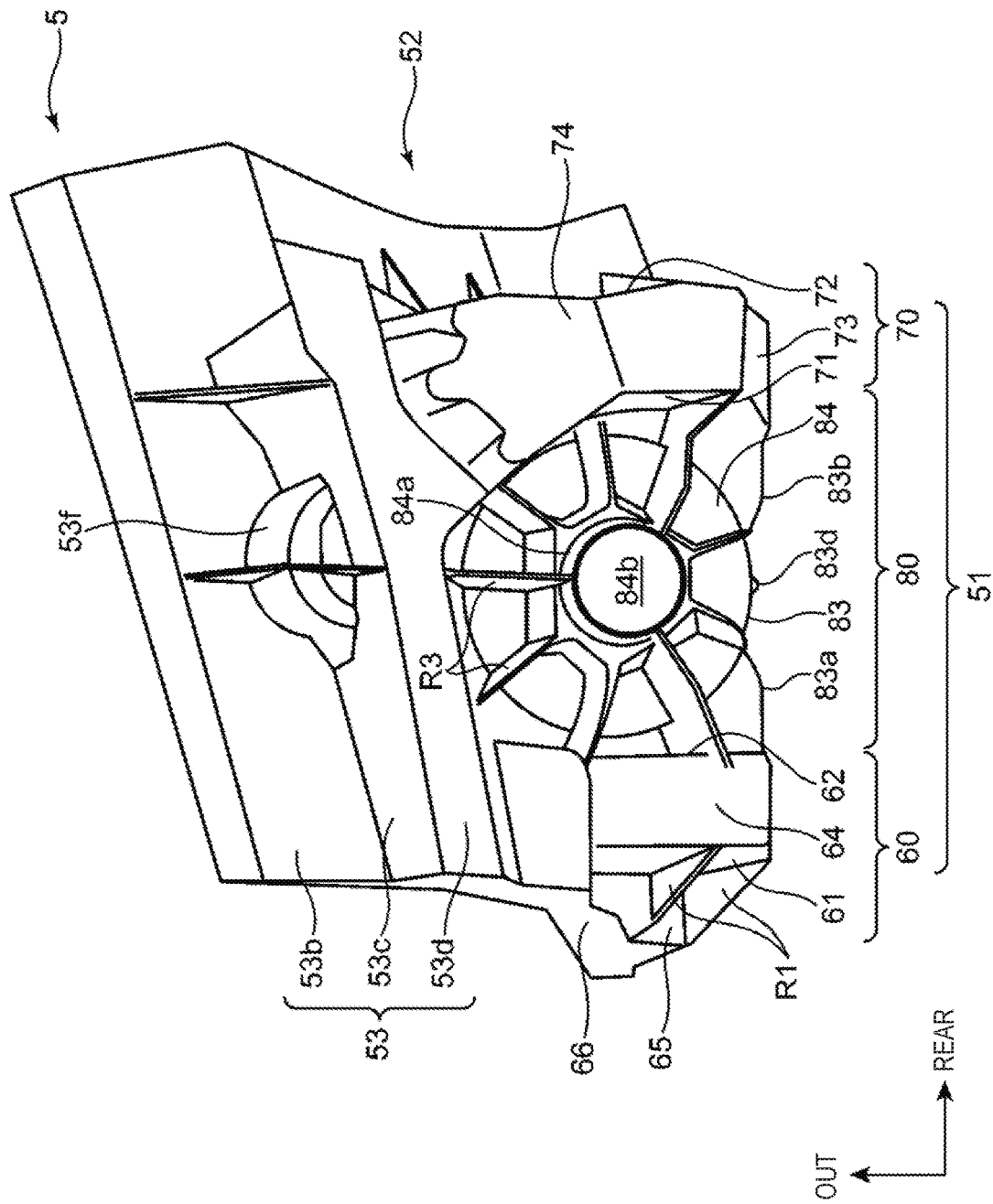
FIG. 11 is a schematic top view of the suspension housing.
Figure 12:
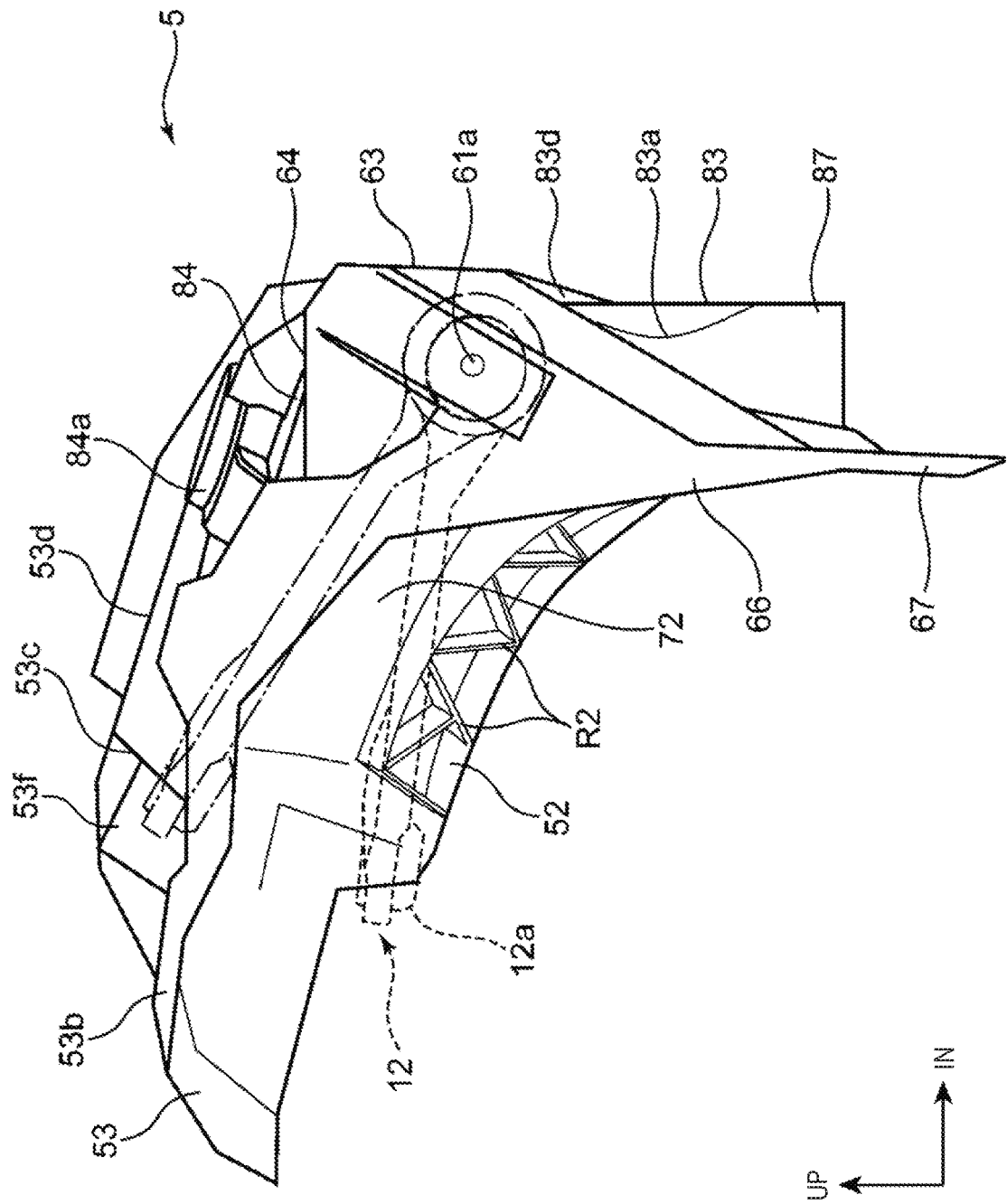
FIG. 12 is a schematic front view of the suspension housing.
Figure 13:
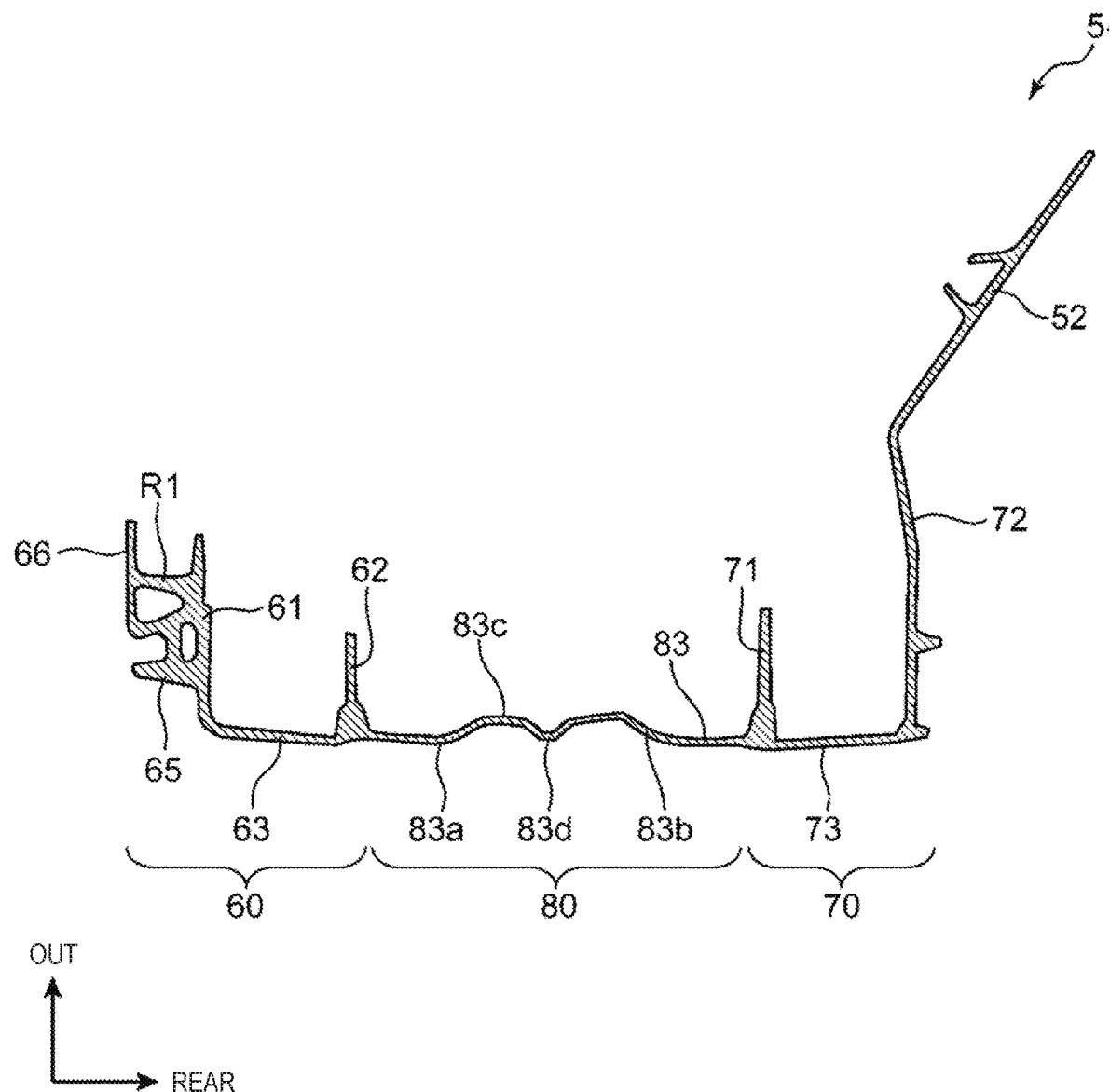
FIG. 13 is a schematic view of section XIII-XIII of FIG. 9.

FIG. 9 is a schematic side view of the suspension housing 5 alone as seen from the inner side in the vehicle width direction. FIG. 10 is a schematic side view of the suspension housing 5 alone as seen from the outer side in the vehicle width direction. FIG. 11 is a schematic top view of the suspension housing 5 alone. FIG. 12 is a schematic front view of the suspension housing 5 alone. FIG. 13 is a schematic view of section XIII-XIII of FIG. 9.

As shown in FIG. 11, the suspension housing 5 is roughly composed of a suspension fixing section 51 which is a part of the suspension housing 5 except for the rear end portion and an outer portion in the vehicle width direction and to which the suspension 10 is fixed; a rear coupling section 52 extending rearward from the suspension fixing section 51 and forming the rear end portion of the suspension housing 5; and an outer coupling section 53 extending outward in the vehicle width direction from the suspension fixing section 51 and the rear coupling section 52 and forming the outer portion in the vehicle width direction of the suspension housing 5. These sections 51, 52, 53 are integrally formed.

In terms of function and structure, the suspension fixing section 51 includes: a first arm supporting part 60 forming a front end part of the suspension fixing section 51; a second arm supporting part 70 forming a rear end part of the suspension fixing section 51; and a main part 80 forming a part between the first arm supporting part 60 and the second arm supporting part 70. The first arm supporting part 60 and the second arm supporting part 70 are examples of "arm supporting parts."

<First Arm Supporting Part>

The first arm supporting part 60 is a part that supports the first arm 13 of the upper arm 12.

The first arm supporting part 60 includes: a first upright wall 61 extending in the up-down direction and the vehicle width direction; a second upright wall 62 extending substantially parallel to the first upright wall 61 on the rear side of the first upright wall 61; a first inner wall 63 extending in the up-down direction and the front-rear direction between an inner edge in the vehicle width direction of the first upright wall 61 and an inner edge in the vehicle width direction of the second upright wall 62; and a first upper wall 64 extending in the vehicle width direction and the front-rear direction between an upper edge of the first upright wall 61 and an upper edge of the second upright wall 62. These walls 61 to 64 of the first arm supporting part 60 form an open cross-sectional part opening outward in the vehicle width direction. An "open cross-section" as termed in this specification refers not to a cross-section that is fully closed or closed with a slight opening left therein by a plate member like the closed cross-sectional part C1, but to a cross-section with an opening that is formed by a plurality of bends so as to protrude into a prism shape, V-shape, etc. relative to a flat surface.

The first arm supporting part 60 further includes: a front extension portion 65 extending frontward from a front surface of the first upright wall 61; a front flange 66 extending downward from a front edge of the front extension portion 65; and a first fixed portion 67 extending downward from the front extension portion 65 and the first inner wall 63.

The first upper wall 64 forms part of a top surface of the suspension housing 5. The first upper wall 64 extends from the upper edge of the first inner wall 63 outward in the vehicle width direction, to a position on the outer side in the vehicle width direction of the first upright wall 61 and the second upright wall 62.

The first inner wall 63 forms part of an inner side surface in the vehicle width direction of the suspension housing 5. As shown in FIG. 4, etc., an upper part of the first inner wall 63 extends substantially vertically, while a lower part of the first inner wall 63 is inclined so as to be located farther on the outer side in the vehicle width direction as it extends downward.

The first upright wall 61, the front extension portion 65, and the front flange 66 form part of a front end portion of the suspension housing 5. A space between the front extension portion 65 and the first upright wall 61 is bridged by a plurality of ribs R1, and the rigidity of the first upright wall 61 is enhanced by the front extension portion 65 and these ribs R1. As shown in FIG. 10, a plurality of ribs are provided also on a lower surface of the front extension portion 65, and the rigidity of the front extension portion 65 and, as a consequence, the rigidity of the first upright wall 61 are thereby enhanced.

As shown in FIG. 13, the length in the vehicle width direction of the second upright wall 62 is set to be shorter than the length in the vehicle width direction of the first upright wall 61. As shown in FIG. 4, etc., the second upright wall 62 has such a shape that the dimension in the vehicle width direction increases toward the upper side.

As shown in FIG. 4, FIG. 12, etc., the first upright wall 61 and the second upright wall 62 have shaft holes 61*a*, 62*a* which are formed substantially at centers in the up-down direction of these upright walls and through which a shaft member for pivotally supporting the first arms 13 is inserted. As shown in FIG. 7, etc., the first pivotally supported portion 13*a* of the first arm 13 is housed between the first upright wall 61 and the second upright wall 62. In this housed state, the shaft member extending in the front-rear direction is passed through a hole (not shown) formed in the first pivotally supported portion 13*a* and the shaft holes 61*a*, 62*a* of the upright walls 61, 62, and this shaft member is fixed to the second upright wall 62, so that the first arm 13 is supported by the first arm supporting part 60 so as to be able to turn in the up-down direction.

In this embodiment, the shaft member and, as a consequence, the first arm 13 are fixed on the rear side of the second upright wall 62. More specifically, a fixing member for fixing the shaft member is attached to the shaft member on the rear side of the second upright wall 62, and the fixing member and the shaft member are fixed to the second upright wall 62 with a tool on the rear side of the second upright wall 62.

<Second Arm Supporting Part>

The second arm supporting part 70 is a part that supports the second arm 14 of the upper arm 12.

The second arm supporting part 70 includes: a third upright wall 71 extending substantially parallel to the second upright wall 62 (i.e., extending in the up-down direction and the vehicle width direction) on the rear side of the second upright wall 62; a fourth upright wall 72 extending substantially parallel to the third upright wall 71 (i.e., extending in the up-down direction and the vehicle width direction) on the rear side of the third upright wall 71; a second inner wall 73 extending in the up-down direction and the front-rear direction between an inner edge in the vehicle width direction of the third upright wall 71 and an inner edge in the vehicle width direction of the fourth upright wall 72; and a second upper wall 74 extending in the vehicle width direction and the front-rear direction between an upper edge of the third upright wall 71 and an upper edge of the fourth upright wall 72. These walls 71 to 74 of the second arm supporting part 70 form an open cross-sectional part opening outward in the vehicle width direction.

The second arm supporting part 70 further includes a second fixed portion 77 extending downward from the second inner wall 73.

The second upper wall 74 forms part of the top surface of the suspension housing 5. The second upper wall 74 extends outward in the vehicle width direction from the upper edge of the second inner wall 73 while being slightly inclined such that the outer side in the vehicle width direction of the second upper wall 74 is located farther on the upper side than the inner side in the vehicle width direction thereof.

The second inner wall 73 forms part of the inner side surface in the vehicle width direction of the suspension housing 5. As with the first inner wall 63, an upper part of the second inner wall 73 extends substantially vertically, while a lower part of the second inner wall 73 is inclined so as to be located farther on the outer side in the vehicle width direction as it extends downward.

As shown in FIG. 5, etc., as with the second upright wall 62, the third upright wall 71 has such a shape that the dimension in the vehicle width direction increases toward the upper side. However, as shown in FIG. 13, the third upright wall 71 extends farther outward in the vehicle width direction than the second upright wall 62. The fourth upright wall 72 extends farther outward in the vehicle width direction than the first, second, and third upright walls 61, 62, 71, and the dimension in the vehicle width direction of the fourth upright wall 72 is larger than that of the other upright walls. Moreover, the fourth upright wall 72 is connected to the rear coupling section 52 having a plurality of ribs R2 formed on a lower surface thereof. Thus configured, the second arm supporting part 70 has a higher rigidity than the first arm supporting part 60 in this embodiment.

The third upright wall 71 and the fourth upright wall 72 have shaft holes 71*a*, 72*a*, respectively, which are formed substantially at center in the up-down direction of the third upright wall 71 and substantially at center in the up-down direction of inner part in the vehicle width direction of the fourth upright wall 72 and into which a shaft member for pivotally supporting the second arm 14 is inserted. The second pivotally supported portion 14a of the second arm 14 is housed between the third upright wall 71 and the fourth upright wall 72. In this housed state, the shaft member extending in the front-rear direction is passed through a hole (not shown) formed in the second pivotally supported portion 14a and the shaft holes 71a, 72a of the upright walls 71, 72, and this shaft member is fixed to the third upright wall 71, so that the second arm 14 is supported by the second arm supporting part 70 so as to be able to turn in the up-down direction.

In this embodiment, the shaft member and, as a consequence, the second arm 14 are fixed on the front side of the third upright wall 71. More specifically, a fixing member for fixing the shaft member is attached to the shaft member on the front side of the third upright wall 71, and the fixing member and the shaft member are fixed to the third upright wall 71 with a tool on the front side of the third upright wall 71.

The levels of the shaft holes 71a, 72a formed in the third upright wall 71 and the fourth upright wall 72 are lower than the levels of the shaft holes 61a, 62a formed in the first upright wall 61 and the second upright wall 62. Accordingly, the upper arm 12 is supported by the suspension housing 5 in a posture in which the upper arm 12 is inclined toward an obliquely lower rear side as seen in a side view, with the second pivotally supported portion 14a of the second arm 14 located at a lower level than the first pivotally supported portion 13a of the first arm 13.

<Main Part>

The main part 80 includes a third upper wall 84 extending in the vehicle width direction and the front-rear direction between the first upper wall 64 and the second upper wall 74, and a third inner wall 83 extending substantially vertically downward from an inner edge in the vehicle width direction of the third upper wall 84.

As shown in FIG. 5, etc., the third upper wall 84 is inclined such that the inner side in the vehicle width direction of the third upper wall 84 is located farther on the lower side than the outer side in the vehicle width direction thereof. The third upper wall 84 has a damper fixing portion 84a to which the upper end portion of the damper 11 is fixed. The damper fixing portion 84a protrudes upward substantially at a center of the third upper wall 84, and has a substantially disc shape with a through-hole 84b formed at a center as seen in a top view. As shown in FIG. 13, the damper 11 is housed between the second upright wall 62 and the third upright wall 71 as seen in a side view, and is fixed to the damper fixing portion 84a with the upper end portion of the damper 11 passed through the through-hole 84b of the damper fixing portion 84a. A plurality of ribs R3 extending in the up-down direction are formed around the damper fixing portion 84a, and the rigidity of the damper fixing portion 84a is enhanced by these ribs R3.

The main part 80 further includes a third fixed portion 87 extending downward from the third inner wall 83. The third fixed portion 87 and the second fixed portion 77 are continuous with each other in the front-rear direction, and these fixed portions 77, 87 have a form of a flat surface extending in the front-rear direction. Specifically, the fixed portions 77, 87 are formed such that inner side surfaces and outer side surfaces in the vehicle width direction thereof are continuous with each other and form a flat surface extending in the front-rear direction. The levels of a lower edge of the third fixed portion 87 and a lower edge of the second fixed portion 77 are higher than the level of a lower edge of the first fixed portion 67. In other words, the first fixed portion 67 extends farther downward than the third fixed portion 87 and the second fixed portion 77.

As described above, the third inner wall 83 extends basically in the vertical direction. However, a part of the third inner wall 83 that is continuous with the second upright wall 62 and a part thereof that is continuous with the third upright wall 71 partially bulge inward in the vehicle width direction. Specifically, as shown in FIG. 10, FIG. 13, etc., a portion of a front-side part of the third inner wall 83 that surrounds the shaft hole 62a of the second upright wall 62 as seen in a side view is curved so as to bulge inward in the vehicle width direction while extending frontward from a portion 83c that is located at a center in the front-rear direction of the third inner wall 83 and extends vertically. This bulging portion forms a front bulge 83a bulging inward in the vehicle width direction. Moreover, a portion of a rear-side part of the third inner wall 83 that surrounds the shaft hole 71a of the third upright wall 71 as seen in a side view is curved so as to bulge inward in the vehicle width direction while extending rearward from the center portion 83c in the front-rear direction of the third inner wall 83. This bulging portion forms a rear bulge 83b bulging inward in the vehicle width direction. The front bulge 83a and the rear bulge 83b thus configured are examples of "bulges."

A buckling promoting portion 83d that promotes buckling of the suspension housing 5 in the front-rear direction is provided in the portion 83c of the third inner wall 83 between the front bulge 83a and the rear bulge 83b. More specifically, the buckling promoting portion 83d is provided substantially at a center portion in the front-rear direction of the third inner wall 83 that forms the inner side surface in the vehicle width direction of the suspension housing 5, and has a shape extending in the up-down direction with a bend protruding inward in the vehicle width direction. In this embodiment, the buckling promoting portion 83d is formed as a portion of the third inner wall 83 is pushed out so as to project inward in the vehicle width direction with a constant plate thickness. The suspension housing 5 is configured to buckle from the buckling promoting portion 83d as a starting point when a load equal to or larger than a predetermined load is applied to the suspension housing 5 through the front frame 3 in the front-rear direction as a result of a collision of the vehicle. Since the buckling promoting portion 83d projects inward in the vehicle width direction in this embodiment, the third inner wall 83 deforms so as to bend inward in the vehicle width direction from the buckling promoting portion 83d as the center.

<Rear Coupling Section>

The rear coupling section 52 extends rearward from a rear surface of the fourth upright wall 72. The rear coupling section 52 is shaped so as to be curved downward and inward in the vehicle width direction. In this embodiment, a plurality of ribs R4 extending so as to connect the rear surface of the fourth upright wall 72 and an upper surface of the rear coupling section 52 to each other are provided, and the rigidity of the fourth upright wall 72 and the rear coupling section 52 is enhanced by these ribs R4. Moreover, as mentioned above, the ribs R2 are provided in a lattice pattern on the lower surface of the rear coupling section 52, and the rigidity of the rear coupling section 52 and the rigidity of the fourth upright wall 72 continuous with the rear coupling section 52 are enhanced also by these ribs R2.

A lower end portion of the rear coupling section 52 extends in the up-down direction and functions as a fourth fixed portion 52a. The fourth fixed portion 52a is also an inner end in the vehicle width direction of the rear coupling section 52. The fourth fixed portion 52*a* extends to a level equivalent to that of the first fixed portion 67, and extends farther downward than the third fixed portion 87 and the second fixed portion 77.

<Outer Coupling Section>

The outer coupling section 53 extends outward in the vehicle width direction from inner edges in the vehicle width direction of the first upper wall 64, the second upper wall 74, the third upper wall 84, and the rear coupling section 52. A step is formed in the outer coupling section 53 such that an outer part in the vehicle width direction of the outer coupling section 53 is located below an inner part in the vehicle width direction thereof. The outer coupling section 53 includes: a first lateral wall 53*b* forming the outer part in the vehicle width direction and extending in the vehicle width direction and the front-rear direction; a rising wall 53*c* extending upward from an inner edge in the vehicle width direction of the first lateral wall 53*b*; and a second lateral wall 53*d* extending inward in the vehicle width direction from an upper edge of the rising wall 53*c*. As shown in FIG. 4, etc., the first lateral wall 53*b* extends substantially horizontally, while the second lateral wall 53*d* is slightly inclined toward an obliquely lower inner side such that the inner side in the vehicle width direction of the second lateral wall 53*d* is located farther on the lower side than the outer side in the vehicle width direction thereof.

As shown in FIG. 4, etc., the suspension housing 5 is disposed such that the outer coupling section 53 abuts against the apron reinforcement 4 from the lower side, and the suspension housing 5 is fixed to the apron reinforcement 4 at the outer coupling section 53. Thus, as mentioned above, a closed cross-sectional part C2 extending in the front-rear direction is formed between the apron reinforcement 4 and an upper surface of the outer coupling section 53.

A recessed portion 53*f* protruding upward is provided substantially at a center portion in the front-rear direction of the first lateral wall 53*b*. The recessed portion 53*f* protrudes outward in the vehicle width direction from the rising wall 53*c*. In this embodiment, the recessed portion 53*f* has a semicircular shape protruding outward in the vehicle width direction from the rising wall 53*c*. This shape of the recessed portion 53*f* corresponds to the shape of an outer portion in the vehicle width direction of the knuckle fixing portion 12*a*. More specifically, the knuckle fixing portion 12*a* has a substantially circular shape as seen in a plan view, and the recessed portion 53*f* has a semicircular shape corresponding to the shape of the outer portion in the vehicle width direction of the knuckle fixing portion 12*a* that is semicircular as seen in a plan view.

As shown in FIG. 12, the recessed portion 53*f* is formed on a turning path of the knuckle fixing portion 12*a* so as to extend in the up-down direction along this turning path. Thus, when the upper arm 12 turns upward from a state indicated by the dashed lines to the state indicated by the dotted-dashed lines in FIG. 13, the knuckle fixing portion 12*a* enters the recessed portion 53*f*, so that the knuckle fixing portion 12*a* and the suspension housing 5 do not interfere with each other. Specifically, the recessed portion 53*f* is formed such that the outer portion in the vehicle width direction of the knuckle fixing portion 12*a* enters the recessed portion 53*f* when the upper arm 12 has turned to an uppermost position. In this embodiment, the recessed portion 53*f* is provided on the outer side in the vehicle width direction of the damper fixing portion 84*a*, at roughly the same position as the position of the damper fixing portion 84*a* in the front-rear direction.

<Mounting Structure of Suspension Housing and Front Frame>

The suspension housing 5 configured as has been described above is fixed to the front frame 3 as the fixed portions 67, 77, 87, 52*a* are joined to the front frame 3.

As shown in FIG. 4 and FIG. 9, the first fixed portion 67 is joined to the first side surface part 3*a* forming the outer side surface in the vehicle width direction of the front frame 3. Specifically, a first fixing portion 167 to which the first fixed portion 67 is fixed is provided in the first side surface part 3*a* of the front frame 3, and the first fixing portion 167 and the first fixed portion 67 are joined together.

As shown in FIG. 5 and FIG. 9, the second fixed portion 77 and the third fixed portion 87 are joined to the upper flange 3*e* of the front frame 3. Specifically, a second fixing portion 168 to which both the second fixed portion 77 and the third fixed portion 87 are fixed is provided in the upper flange 3*e* of the front frame 3, and the second fixing portion 168, the second fixed portion 77, and the third fixed portion 87 are joined together. As described above, the second fixed portion 77 and the third fixed portion 87 are continuous with each other in the front-rear direction, and the second fixing portion 168 extends over a wide area in the front-rear direction. More specifically, the length in the front-rear direction of the fixed portion combining the second fixed portion 77 and the third fixed portion 87 is longer than the length of the first fixed portion 67 and the length of the fourth fixed portion 52*a*, and the length in the front-rear direction of the second fixing portion 168 is longer than the length of the first fixing portion 167 and the length of a third fixing portion 169, to be described later, to which the fourth fixed portion 52*a* is fixed.

As shown in FIG. 6 and FIG. 9, as with the first fixed portion 67, the fourth fixed portion 52*a* is joined to the first side surface part 3*a* forming the outer side surface in the vehicle width direction of the front frame 3. Specifically, the first side surface part 3*a* of the front frame 3 has the third fixing portion 169 to which the fourth fixed portion 52*a* is fixed, and the third fixing portion 169 and the fourth fixed portion 52*a* are joined together.

The first fixing portion 167, the second fixing portion 168, and the third fixing portion 169 are arranged in this order from the front side in the front-rear direction. The fixed portions 67, 77, 87, 52*a* and the fixing portions 167 to 169 of the front frame 3 are joined together by welding, bonding with an adhesive, etc.

As shown in FIG. 4 and as described above, the upper flange 3*e* of the front frame 3 is located on the inner side in the vehicle width direction of the first side surface part 3*a*. The second fixing portion 168 is offset inward in the vehicle width direction relative to the first fixing portion 167 and the third fixing portion 169, and thus the second fixed portion 77 and the third fixed portion 87 are joined to the front frame 3 at a position offset inward in the vehicle width direction relative to the first fixed portion 67 and the fourth fixed portion 52*a*.

The fixed portions 67, 77, 87, 52*a* are joined to the fixing portions 167 to 169 in a state of abutting against outer side surfaces in the vehicle width direction of these fixing portions 167 to 169 (the outer side surface in the vehicle width direction of the first side surface part 3*a* and the outer side surface in the vehicle width direction of the upper flange 3*e*). The suspension housing 5 is joined to the front frame 3, for example, as the fixed portions 67, 77, 87, 52*a* are pressed against the outer side surfaces in the vehicle width direction of the fixing portions 167 to 169 from the outer side in the vehicle width direction and these portions are welded together in this state, or as the fixed portions 67, 77, 87, 52a are pressed against the outer side surfaces in the vehicle width direction of the fixing portions 167 to 169 from the outer side in the vehicle width direction, with an adhesive interposed therebetween.

Effects and Others

As has been described above, in this embodiment, the first arm supporting part 60 and the second arm supporting part 70 of the suspension housing 5 that respectively support the first arm 13 and the second arm 14 are respectively provided with the first fixed portion 67 and the second fixed portion 77 each joined to the front frame 3, and these first arm supporting part 60 and second arm supporting part 70 are firmly fixed to the front frame 3. Thus, the rigidity of the suspension housing 5 can be enhanced. A load applied from the arms 13, 14 to the arm supporting parts 60, 70 can be appropriately transmitted and dispersed to the front frame 3, and the arms 13, 14, the damper 11, and, as a consequence, the suspension 10 can be stably supported by the suspension housing 5. Moreover, the main part 80 and the rear coupling section 52 have the third fixed portion 87 and the fourth fixed portion 52a, and the suspension housing 5 and the front frame 3 are joined together also at these fixed portions 87, 52a. Therefore, the rigidity of the suspension housing 5 can be further enhanced, and the suspension 10 can be appropriately supported by the suspension housing 5.

Here, while such a suspension housing 5 with the enhanced rigidity can appropriately support the suspension 10, this suspension housing 5 may hinder buckling and deformation of the front frame 3 during a collision of the vehicle. Specifically, due to the enhanced rigidity, the suspension housing 5 may undergo no deformation or only a limited amount of deformation in the front-rear direction, thereby hindering or restraining deformation of the part of the front frame 3 to which the suspension housing 5 is fixed. As a countermeasure, the buckling promoting portion 83d is provided on the third inner wall 83 of the suspension housing 5 in this embodiment to promote buckling of the suspension housing 5 in the front-rear direction. During a collision of the vehicle, therefore, the suspension housing 5 is allowed to buckle and prevented from hindering deformation and buckling of the front frame 3, so that the front frame 3 is allowed to deform and buckle appropriately. Thus, this embodiment makes it possible to allow the front frame 3 to deform appropriately while appropriately supporting the suspension 10.

In particular, in this embodiment, the buckling promoting portion 83d is formed in the third inner wall 83 and has a shape extending in the up-down direction with a bend protruding inward in the vehicle width direction. Thus, the third inner wall 83 and, as a consequence, the suspension housing 5 are more reliably allowed to buckle from the buckling promoting portion 83d as a starting point. Moreover, the third inner wall 83 is allowed to deform inward in the vehicle width direction, which can prevent the suspension housing 5 from popping out toward the vehicle outer side.

In this embodiment, the front bulge 83a and the rear bulge 83b bulging inward in the vehicle width direction are further provided in the third inner wall 83, at a portion between the first arm supporting part 60 and the second arm supporting part 70. During a collision of the vehicle, therefore, the third inner wall 83 is allowed to buckle from junctions between the bulges 83a, 83b and other portions as starting points, which can promote buckling of the suspension housing 5.

More specifically, the third inner wall 83 is allowed to buckle in the front-rear direction from the junction between the front bulge 83a and a part of the portion 83c on the rear side of the front bulge 83a, and the junction between the rear bulge 83b and a part of the portion on the front side of the rear bulge 83b, as starting points. This can further promote buckling and deformation of the suspension housing 5.

In particular, as the buckling promoting portion 83d is provided between these bulges 83a, 83b, the third inner wall 83 is allowed to deform such that the junction between the front bulge 83a and the portion 83c on the rear side thereof shifts inward in the vehicle width direction; that the buckling promoting portion 83d shifts outward in the vehicle width direction; and that the junction between the rear bulge 83b and the portion 83c on the front side thereof shifts outward in the vehicle width direction. Thus, the third inner wall 83 can be effectively crushed in the front-rear direction, and the third inner wall 83 and the suspension housing 5 can be even more reliably prevented from hindering deformation of the front frame 3.

Moreover, with the front bulge 83a and the rear bulge 83b thus provided, a working space for the work of mounting the upper arm 12 to the first arm supporting part 60 and the second arm supporting part 70 can be increased, which can improve the work efficiency. More specifically, as described above, the upper arm 12 is fixed to the first arm supporting part 60 and the second arm supporting part 70 as a tool is inserted to the rear side of the second upright wall 62 of the first arm supporting part 60 and a predetermined fixing member is fixed to the second upright wall 62, and as a tool is inserted to the front side of the third upright wall 71 of the second arm supporting part 70 and a predetermined fixing member is fixed to the third upright wall 71. This fixing work needs to be performed in a space between an outer side surface in the vehicle width direction of the third inner wall 83 and each of the upright walls 62, 71. Specifically, it is required to mount the fixing members to the upright walls 62, 71 from the vehicle outer side, and to insert the tool to near the upright walls 62, 71 and manipulate the tool from the vehicle outer side. Therefore, when the bulges 83a, 83b bulging inward in the vehicle width direction are provided in the third inner wall 83 as described above, a larger space can be secured for mounting the fixing members and manipulating the tool, which can facilitate the mounting work.

Variations

In the above embodiment, the case where a double-wishbone suspension is used as the suspension has been described. However, the suspension is not limited to this type and may be any suspension that includes an arm member supported by the suspension housing 5. For example, a multi-link suspension may be used. More specifically, a plurality of link members that individually couple together a tire and a suspension housing may be provided in place of the arms.

The detailed structure of the suspension housing 5 is not limited to that described above. For example, the rear coupling section 52 and the outer coupling section 53 may be omitted. The positions at which the ribs R1 to R4 are provided, etc. are not limited to those described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. A front vehicle body structure of a vehicle, comprising:
a front frame provided at a front part of the vehicle and extending in a vehicle front-rear direction; and
a suspension housing which is provided at the front part of the vehicle and to which a suspension is mounted,
wherein the suspension housing has a first fixed portion and a second fixed portion that are provided at positions separated from each other in the front-rear direction and each fixed to the front frame, and a buckling promoting portion that is provided at a position between the first fixed portion and the second fixed portion in the front-rear direction and promotes buckling of the suspension housing when a load is applied from the front frame to the suspension housing in the front-rear direction, and
wherein the suspension housing comprises:
a plurality of arm supporting parts that are provided at positions separated from one another in the front-rear direction and support a suspension arm of the suspension; and
a bulge that is formed in a region of an inner side surface in a vehicle width direction of the suspension housing, located between the arm supporting parts in the front-rear direction, so as to bulge inward in the vehicle width direction.

2. The front vehicle body structure of the vehicle according to claim 1, wherein the buckling promoting portion is formed in the inner side surface in the vehicle width direction of the suspension housing and has a shape extending in an up-down direction with a bend protruding inward in the vehicle width direction.

3. The front vehicle body structure of the vehicle according to claim 2, wherein
the bulge is one of a plurality of bulges separated from one another in the vehicle front-rear direction; and
the buckling promoting portion is provided between the bulges in the front-rear direction.

4. The front vehicle body structure of the vehicle according to claim 1, wherein
the bulge is one of a plurality of bulges separated from one another in the vehicle front-rear direction; and
the buckling promoting portion is provided between the bulges in the front-rear direction.

5. A front vehicle body structure of a vehicle, comprising:
a front frame provided at a front part of the vehicle and extending in a vehicle front-rear direction; and
a suspension housing which is provided at the front part of the vehicle and to which a suspension is mounted,
wherein the suspension housing has a first fixed portion and a second fixed portion that are provided at positions separated from each other in the front-rear direction and each fixed to the front frame, and a buckling promoting portion that is provided at a position between the first fixed portion and the second fixed portion in the front-rear direction and promotes buckling of the suspension housing when a load is applied from the front frame to the suspension housing in the front-rear direction,
wherein the buckling promoting portion is formed in an inner side surface in a vehicle width direction of the suspension housing and has a shape extending in an up-down direction with a bend protruding inward in the vehicle width direction, and
wherein an inner wall of the suspension housing, forming the inner side surface in the vehicle width direction of the suspension housing, includes a bulging part which is formed to bulge inward in the vehicle width direction.

6. The front vehicle body structure of the vehicle according to claim 5, wherein the bulging part is formed to bulge inward in the vehicle width direction with a constant plate thickness.

7. The front vehicle body structure of the vehicle according to claim 6, wherein the suspension housing comprises:
a plurality of arm supporting parts that are provided at positions separated from one another in the front-rear direction and support a suspension arm of the suspension; and
a bulge that is formed in a region of the inner side surface in the vehicle width direction of the suspension housing, located between the arm supporting parts in the front-rear direction, so as to bulge inward in the vehicle width direction.

8. The front vehicle body structure of the vehicle according to claim 7, wherein
the bulge is one of a plurality of bulges separated from one another in the vehicle front-rear direction; and
the buckling promoting portion is provided between the bulges in the front-rear direction.

9. The front vehicle body structure of the vehicle according to claim 5, wherein the suspension housing comprises:
a plurality of arm supporting parts that are provided at positions separated from one another in the front-rear direction and support a suspension arm of the suspension; and
a bulge that is formed in a region of the inner side surface in the vehicle width direction of the suspension housing, located between the arm supporting parts in the front-rear direction, so as to bulge inward in the vehicle width direction.

10. The front vehicle body structure of the vehicle according to claim 9, wherein
the bulge is one of a plurality of bulges separated from one another in the vehicle front-rear direction; and
the buckling promoting portion is provided between the bulges in the front-rear direction.

* * * * *